United States Patent [19]

Kausch et al.

[11] Patent Number: 4,725,636
[45] Date of Patent: Feb. 16, 1988

[54] ELASTHANE THREADS, THEIR PRODUCTION AND INTERMEDIATE PRODUCTS REQUIRED THEREFOR

[75] Inventors: Michael Kausch, Cologne; Hans Schröer, Dormagen; Karl-Heinz Wolf, Cologne; Heinz Gall, Pulheim; Carlhans Süling, Odenthal; Rudi Dauscher, Dormagen, all of Fed. Rep. of Germany

[73] Assignee: Bayer Aktiengesellschaft, Leverkusen, Fed. Rep. of Germany

[21] Appl. No.: 847,782

[22] Filed: Apr. 3, 1986

[30] Foreign Application Priority Data

Apr. 19, 1985 [DE] Fed. Rep. of Germany ....... 3514187
Nov. 23, 1985 [DE] Fed. Rep. of Germany ....... 3541407

[51] Int. Cl.⁴ ............................................. C08G 18/32
[52] U.S. Cl. ..................... 524/251; 524/342; 524/343; 524/721; 528/49; 528/65; 528/78; 528/82; 528/84; 528/85
[58] Field of Search ............... 524/251, 342, 343, 721; 528/49, 65, 78, 82, 84, 85

[56] References Cited
U.S. PATENT DOCUMENTS
3,461,106 8/1969 Oertel et al. ........................ 528/82

Primary Examiner—Maurice J. Welsh
Attorney, Agent, or Firm—Sprung Horn Kramer & Woods

[57] ABSTRACT

In the production of elasthane threads by solution spinning of polyurea polyurethanes by conventional spinning processes, excellent stabilization against light and noxious gases are obtained if at least one component of the system to be spun contains tertiary amino groups and the substances used as antioxidizing agents are phenols of the kind which do not form colored nitro compounds.

9 Claims, No Drawings

ELASTHANE THREADS, THEIR PRODUCTION AND INTERMEDIATE PRODUCTS REQUIRED THEREFOR

This invention relates to stabilized elasthane threads, a process for their production and to intermediate products preferably used as stabilisers.

The term "elasthane threads" (spandex threads) is used to denote threads consisting of at least 85% by weight of segmented polyurethanes. The elastic and mechanical properties are obtained by using polyurea polyurethanes prepared from aromatic diisocyanates. Such elasthanes are produced by spinning solutions either by the wet spinning or, preferably, the dry spinning process. Polar solvents, such as dimethyl sulphoxide, N-methyl pyrrolidone and, preferably, dimethyl formamide or dimethyl acetamide, are suitable for this purpose.

Elasthanes essentially have to be stabilized against light and noxious gases and for this reason contain stabilizers which are either introduced as additives to the spinning solution or incorporated into the segmented polyurethane. If additives are used, these should not be volatile under the spinning conditions.

If elasthane production is carried out by a spinning process in which air is used as spinning gas, the oxidizing effect of the spinning gas at the relatively high spinning temperatures occurring must be taken into account in the choice of stabilizer components. Spinning gas temperatures of from 200° to 400° C. are normally reached in the spinning process.

Use of polymeric amines as stabilizers for segmented polyurethanes is known from DE-OS No. 1,669,511 or DE-AS No. 1,126,603. The stabilities of these polyurea polyurethanes do not satisfy present day technical requirements in that, on the one hand, the stabilizing compounds should not deleteriously affect the mechanical and elastic properties and, on the other hand, the effectiveness of the stabilizer systems used should not be impaired by any of the process steps from production of the thread to the finished manufactured article such as corsetry or bathing wear.

DE-AS No. 1,918,066 discloses use of a non-segmented polyurethane containing tertiary butyl amino groups in the polymer chain as stabilizer. This stabilization also fails to provide the required results and a combination with phenolic stabilizers such as tetrakis-[3-(3,5-di-tertiary-butyl-4-hydroxyphenyl)-propionyl-oxymethyl]-methane does not provide sufficient stabilization.

It has now been found that highly stabilized elasthane threads may be prepared from polyurea polyurethanes if at least one component of the system which is to be spun contains tertiary amino groups and if phenols which do not form coloured nitro compounds are used as antioxidants.

The question of whether coloured nitro compounds are formed is decided by the noxious gas test according to ISO 105/G02.

The combination according to this invention of compounds which have a stabilizing action may be added to polyurea polyurethane solution either during the synthesis or after completion of the synthesis. One particular method of carrying out the synthesis of fibre polymer and the stabilization according to the invention involves using tertiary amines containing hydroxyl groups, e.g. bis-2-hydroxy propyl methylamine, as additional diol components for the preparation of the prepolymer.

Another preferred method involves the addition of a polyurethane obtained from an aliphatic diisocyanate, in particular dicyclohexyl methane diisocyanate, and tertiary aminodiols to the spinning solution. Suitable aminodiols are those mentioned on page 4.

The phenols to be used according to the invention include those phenols which do not form nitro compounds with the nitrogen oxides of the atmosphere.

Preferred phenols correspond to the formula

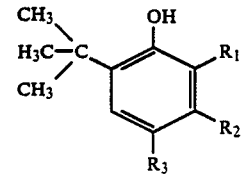

wherein
$R_1$ denotes $C_1-C_6$ alkyl,
$R_2$ and $R_3$ denote, independently, $C_1-C_6$ alkyl or $-(CH_2)_n-X$,
n denotes 1 or 2 and
X denotes a monovalent or higher valent acyl group.

The acyl groups may be residues of any organic acids, such as acetyl, benzoyl, furoyl, isophthalyl or the isocyanurate residue.

Preparation of the polyurea polyurethanes may be carried out by known procedures. One process which proved to be particularly satisfactory is the synthesis of the fibre raw materials by the prepolymer process in which, in the first stage of the process, a long chain diol is reacted with a diisocyanate either in solution or solvent-free to form a prepolymer in such a manner that the reaction product contains isocyanate end groups.

The diols used are preferably polyester diols or polyether diols. Mixtures of polyester and polyether diols may also be used. The diols generally have a molecular weight of from 1,000 to 6,000.

Examples of suitable polyester diols include dicarboxylic acid polyesters which may be derived from several alcohols and several carboxylic acids. Copolyesters of adipic acid, hexanediol and neopentyl glycol in proportions of 1:0,7:0,43 by moles are particularly suitable. The polyesters preferably have a molecular weight of from 1,000 to 4,000.

Examples of suitable polyether diols include polytetramethylene oxide diols, preferably with molecular weights of from 1,000 to 2,000. Copolyethers obtained by the reaction of polytetramethylene oxide diols with ethylene oxide are particularly preferred.

Mixtures of polyether and/or polyester diols with diols containing tertiary amino groups may, of course, also be used. Particularly suitable, for example, are the N-alkyl-N,N-bis-hydroxy-alkylamines. The following are mentioned as examples:

4-tertiary-butyl-4-azaheptane-2,6-diol; 4-methyl-4-azaheptane-2,6-diol; 3-ethyl-3-azapentane-1,5-diol; 2-ethyl-2-dimethylamino methyl-propane-1,3-diol; 4-tertiary-pentyl-4-azaheptane-2,6-diol; 3-cyclohexyl-3-azapentane-1,5-diol, 3-tert-butylmethyl-3-azapentandiol-1,5, 3-tert.-pentyl-3-aza-pentandiol-1,5.

Conventional aromatic diisocyanates may be used for synthesizing the elasthane raw maerials, optionally in admixture with small proportions of aliphatic diisocyanates:

2,4-tolylene diisocyanate and isomeric mixtures thereof and 4,4'-diphenyl methane diisocyanate and isomeric mixtures thereof. Mixtures of different aromatic diisocyanates may, of course, be used. The following aliphatic diisocyanates are also suitable components for the mixture:

Hexamethylene diisocyanate, isophorondiisocyanate and dicyclohexylmethane diisocyanate. A special embodiment of the invention involves the use of trans 1,4-cyclohexane diisocyanate as a component of the mixture.

Another particularly advantageous synthesis of elasthane raw materials according to the invention involves mixing polyester- and polyether-polyurethane prepolymers and then reacting them in known manner to form polyurea polyurethanes. The proportions in which the polyester diols and polyether diols should be mixed for any given technical purpose may easily be determined by preliminary test.

In the synthesis of polyurea polyurethanes, the required urea groups are introduced into the macromolecules by a chain extension reaction. The macrodiisocyanates which have been synthesized at the prepolymer stage are normally reacted in solution with diamines, such as ethylene diamine, tetramethylene diamine, 1,3-cyclohexane diamine, isophorone diamine or mixtures of these diamines: Low amounts of monoamines, e.g. diethylamine or dibutylamine may be used to adjust the molecular weight of the final polyurethane urea during chain extension. $CO_2$ may be used as retarding agent in the chain extension reaction.

Mixing of polyester- and polyether-polyurethane ureas may still be carried out after completion of the elasthane synthesis.

The phenols are preferably used in quantities of from 0.1 to 2% by weight, based on the polyurethane polyurea, while the tertiary amines are preferably used in quantities resulting in from 0.02 to 0.3% by weight of tertiary nitrogen in the elasthanes. The amines for the additives and for the incorporation into the polymer are preferably N-$C_1$-$C_8$-alkyl- or -$C_5$-$C_7$-cycloalkyl-di-$C_2$-$C_3$-alkanolamines.

EXAMPLE 1

10 kg of a polytetramethylene ether glycol having a molecular weight of 2,000 and OH number 56 were diluted with 3.07 kg of dimethyl acetamide, 2.27 kg of diphenyl methane diisocyanate were added to the mixture which had been adjusted to 25° C., and the reaction was left to proceed at 50°-55° C. for 60 to 90 minutes until the isocyanate content of the prepolymer was 2.65%.

220 g of ethylene diamine and 23 g of diethylamine as chain-terminating agent were dissolved in 37.2 kg of dimethyl acetamide and introduced into a reaction vessel, and 250 g of solid $CO_2$ were added so that a carbamate suspension were than added to this suspension with vigorous stirring. A homogeneous, clear, colourless elastomer solution having a solids content of 22% by weight and a solution viscosity of 70 Pa.s was obtained. The inherent viscosity of the polymer was 1.2 dl/g (5 g/l of dimethyl acetamide at 30° C.).

To the viscous polymer solution were then added 4% by weight of titanium dioxide and 1% by weight of 1,3,5-tris(4-t-butyl-3-hydroxy-2,6-dimethyl-benzyl)-isocyanurate, based in each case on the PU solids content, and a polyurethane prepared according to Example 2a from dicyclohexyl methane diisocyanate and 4-tertiary-pentyl-azaheptandiol-2,6, having an inherent viscosity of 0.21 dl/g (25° C., 5 g/l of dimethyl acetamide), so that the tertiary nitrogen content was 100 milliequivalent (mVal)/kg of solid content.

EXAMPLE 2

A. 3.67 kg of 4-methyl-4-azaheptandiol-2,6, 6.42 kg of dicyclohexyl methane diisocyanate, 6.73 kg of dimethyl acetamide and 20 g of dibutyl tin dilaurate were heated to 70° C. for 3.5 hours with stirring. All the isocyanate put into the process had reacted by the end of that time. The solution was cooled and diluted to 22% by weight by the addition of 29 kg of dimethyl acetamide. A clear, highly fluid solution of the basic polyurethane having an inherent viscosity (see Example 1) of 0.26 was obtained.

B. A polyester containing hydroxyl end groups and having an average molecular weight of 2,000 and an OH number of 56 was prepared by the reaction of 10 kg of adipic acid with 8.1 kg of hexanediol and 7.1 kg of neopentyl glycol.

C. 10 kg of the polyester according to B. were heated to 50°-54° C. for 60 minutes together with 3.1 kg of dimethyl acetamide and 2.3 kg of diphenyl methane diisocyanate until the isocyanate content of the prepolymer was 2.66%.

240 g of ethylene diamine were dissolved in 41.4 kg of dimethyl acetamide and introduced into a reaction vessel, and 260 g of solid $CO_2$ were added so that a carbamate suspension was formed. 15.35 kg of the polyester-isocyanate prepolymer solution were added to this suspension at 10° C. with vigorous stirring. A homogeneous, clear elastomer solution having a solids content of 22% by weight and a solution viscosity of 98 Pa.s was obtained. 4% by weight of titanium dioxide and 1% by weight of 1,3,5-tris-(4-t-butyl-3-hydroxy-2,6-dimethyl benzyl)isocyanurate, based in each case on the PU solids content, and 2.5 kg of solution A. were added to the viscous polymer solution so that the tertiary nitrogen content was 100 mVal/kg of solid content.

EXAMPLE 3

Example 1 was repeated with an additive from 4-methyl-4-azaheptane-2,6-diol and isophorondiisocyanate instead of the additive from 4-tertiary-pentyl-4-azaheptandiol-2,6 and dicyclohexylmethanediisocyanate and with 0.5% by weight of the compound of the formula

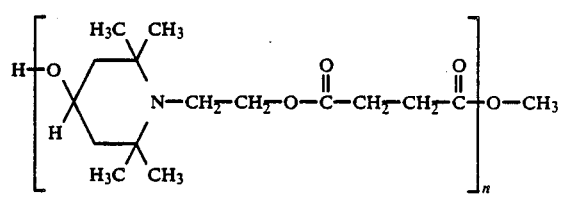

(pale yellow powder with a molecular weight $M_n$ of more than 3000, a melting range of from 55° to 70° C. and a density of 1.18 g/cm³).

EXAMPLE 4

Example 2 was repeated with the following additives:
4a from 3 methyl-3-azapentane-1,5-diol and dicyclohexylmethane diisocyanate.
4b from 3-cyclohexyl-3-azapentane-1,5-diol and dicyclohexylmethane diisocyanate.

4c from 4-tertiary-butyl-4azaheptane-2,6-diol and dicyclohexylmethane diisocyanate.

4d from 3-tertiary-butylmethyl-3-azaheptane-1,5-diol and dicyclohexylmethane diisocyanate.

4e from 3-tertiary-pentyl-3-azapentane-1,5-diol and dicyclohexylmethane diisocyanate.

4f from 4-methyl-4-azaheptane-2,6-diol and hexamethylene diisocyanate, containing additionally 0.5% by weight of the compound of the formula of Example 3.

EXAMPLE 5

10 kg of the polyester from Example 2 together with 190 g of 4-methyl-4-azaheptandiol-2,6, 2,6 kg of diphenyl methane diisocyanate and 3.2 kg of dimethyl acetamide were heated to 50°-54° C. for 100 minutes with stirring until the isocyanate content of the prepolymer was 2.66% by weight. 245 g of ethylene diamine were dissolved in 43.35 kg of dimethyl acetamide and introduced into a reaction vessel, and 270 g of solid $CO_2$ were added so that a carbamate suspension was formed. 16 kg of the prepolymer solution were added to this suspension with vigorous stirring. A homogeneous, clear elastomer solution having a solids content of 22% by weight and a solution viscosity of 92.6 Pa.s was obtained. 4% by weight of titanium dioxide and 1% by weight of 1,3,5-tris-(4-t-butyl-3-hydroxy-2,6-dimethylbenzyl)-isocyanurate, based in each case on the PU solids content, and 0.5% by weight of the compound of the formula of Example 3 were added to the viscous polymer solution.

EXAMPLE 6

A solution of a segmented linear polyester polyurea polyurethane was prepared as described in Example 5. Instead of additives mentioned in Example 3 4% by weight of titanium dioxide and 1% by weight of pentaerythrityltetrakis-[3-(3-t-butyl-4,5-dimethyl-4-hydroxyphenyl)-propionate], based in each case on the PU solids content, were added to the resulting polymer solution.

EXAMPLE 7

Example 3 was repeated with the polyester of example 2 instead of the polyether.

EXAMPLE 8

Example 7 was repeated with 3% by weight of the compound of the formula according to Example 3 and without the additive from 4-methyl-4-aza-heptane-2,6-diol and isophoronediisocyanate.

EXAMPLE 9

Example 8 was repeated with the polyether of example 1 instead of the polyester.

Comparison Example

Example 6 was repeated with pentaerythrityltetrakis-[3-(3,5-di-tertiary-butyl-4-hydroxyphenyl)-propionate] instead of the pentaerythrityl-tetrakis-[3-(3-tertiarybutyl-4,5-dimethyl-4-hydroxyphenyl)-propionate].

Production of the Test Samples

The solutions prepared according to the Examples were dry spun by a conventional process to form a multifilament thread having a total fineness of 160 dtex. Circula knitted samples of these threads were (a) brightened in an acidic medium, (b) bleached in an alkaline medium according to the following methods and then subjected to fastness test to nitrogen oxide according to ISO 105/G02 and subjected to a fastness test to light in the fade-o-meter apparatus.

The results given in the following table were obtained wherein 5 is the best and 1 the worst possible result.

Method of performing the combustion gas test

Exposure to nitrogen oxide according to ISO 105/G02 was carried out by combustion of butane gas, commercially available camping gas being used. The temperature prevailing at the same height as the samples was measured with an Ni-Cr-Ni thermocouple during the whole of each cycle and recorded by a compensograph. The relative moisture in the device was also recorded.

The following conditions were employed throughout the test procedure:

Revolutions of the air-circulating stirrer: 2.5/min
Number of cycles per series 1
Duration, temperature and relative moisture of the cycles:

| Series | Duration [hours] | Max. temp. [°C.] | Min. temp. [°C.] | Rel. moisture [%] |
|---|---|---|---|---|
| A | 19.7 | 64 | 56 | 24 |
| B | 16.7 | 64.5 | 56 | 32 |
| C | 18.9 | 56 | 52 | 36 |

A cycle was completed when the specified control sample introduced into the apparatus together with the test pieces displayed a definite change in colour. Camping gas differs from pure butane gas by small added amounts of propane or by an odorising substance added in an amount within the ppm range.

The change in colour of each of the exposed samples compared with the starting material was assessed using the grey scale on the outside, number 5 corresponding to practically no colour change and number 1 corresponding to a pronounced colour change.

Series A was carried out with the original filaments, B with the acidically brightened filaments and C with the alkaline-bleached filaments.

Series B and C were necessary since elasthane filaments are processed together with polyamide filaments which are acidically brightened or together with cotton filaments which are alkaline-bleached.

The acidic brightening was carried out in the customary manner with a liquor which contained 1.8% by weight of an anionic brightener and 3 g/l of sodium hydrosulfite at a pH of 5. The material was introduced into the liquor at 40° C., the liquor was heated to 90° C. and kept at this temperature for 60 minutes, the material was then taken out, rinsed with a warm and a cold rinsing liquid and dried at 70° C.

The alkaline bleaching was carried out with a liquor containing 6 ml of 35% strength (by weight) $H_2O_2$/l and 1% by weight of a substantive brightener at pH 11. The procedure was the same as that used for the acidic brightening.

TABLE I

| | Fastness to nitrogen oxide | | |
|---|---|---|---|
| Example | Series A | Series B | Series C |
| 1 | 3–4 | 3 | 3–4 |
| 2 | 3 | 3 | 3–4 |
| 3 | 2–3 | 3 | 3–4 |
| 4a | 2–3 | 3 | 2–3 |
| 4b | 2 | 3 | 2–3 |

TABLE I-continued

| | Fastness to nitrogen oxide | | |
|---|---|---|---|
| Example | Series A | Series B | Series C |
| 4c | 3–4 | 3 | 4 |
| 4d | 3 | 3 | 3–4 |
| 4e | 3 | 3 | 3–4 |
| 4f | 3–4 | 3–4 | 3–4 |
| 5 | 3–4 | 3–4 | 3–4 |
| 6 | 2 | 2 | 2–3 |
| 7 | 3–4 | 3–4 | 3–4 |
| 8 | 3 | 3–4 | 3–4 |
| 9 | 3 | 3–4 | 3 |
| Comparison | 1 | 1 | 1–2 |

TABLE II

| | Fastness to light after 29 standard fade-o-meter hours | | |
|---|---|---|---|
| Example | Series A | Series B | Series C |
| 1 | 4–5 | 4–5 | 4–5 |
| 2 | 4 | 4 | 4 |
| 3 | 5 | 3 | 4–5 |
| 4a | 4 | 3–4 | 4–5 |
| 4b | 4 | 3–4 | 4–5 |
| 4c | 4 | 4 | 4–5 |
| 4d | 4 | 3–4 | 4 |
| 4e | 4 | 3–4 | 4–5 |
| 4f | 4 | 2–3 | 4 |
| 5 | 3–4 | 4 | 4 |
| 6 | 3–4 | 3–4 | 3–4 |
| 7 | 4 | 2–3 | 4 |
| 8 | 4 | 3 | 4–5 |
| 9 | 4 | 4 | 4 |
| Comparison | 3 | 3–4 | 4 |

We claim:

1. Process for the production of elasthane threads by solution spinning of polyurea polyurethanes by conventional spinning processes, characterised in that at least one component of the system which is to be spun contains tertiary amino groups and in that phenols which do not form coloured nitro compounds are used as anti-oxidants.

2. Process according to claim 1, characterised in that the phenols correspond to the formula

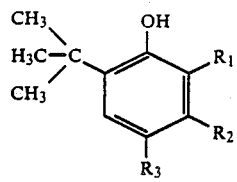

wherein
  $R_1$ denotes $C_1$–$C_6$ Alkyl,
  $R_2$ and $R_3$ denote, independently, $C_1$–$c_6$ alkyl or —$(CH_2)_n$—X,
  n denotes 1 or 2, and
  X denotes a monovalent or higher valent acyl group.

3. Process according to claim 1, characterised in that the polyurea polyurethanes are synthesized from polyester diols in the molecular weight range from 1,000 to 6,000.

4. Process according to claim 1, characterised in that the polyurea polyurethanes are synthesized from polyether diols in the molecular weight range from 1,000 to 6,000.

5. Process according to claim 1, characterised in that the tertiary amino groups are introduced in the form of additives added to the spinning solution.

6. Process according to claim 5, characterised in that the additives are polyurethanes obtained from aliphatic diisocyanates and N-tertiary-pentyl-dipropanolamine.

7. Process according to claim 1, characterised in that the phenols are used in a quantity of from 0.1 to 2% by weight, based on the polyurethane urea, and the tertiary amines are used in such a quantity that elasthane containing from 0.02 to 0.3% by weight of tertiary nitrogen are obtained.

8. Polyurethanes, characterised in that they are synthesized from aliphatic diisocyanates and 4-tertiarypentyl-4-azaheptandiol-2,6.

9. Stabilised elasthane threads of segmented polyurethanes based on polyester or polyetherdiols and at least an aromatic diisocyanate containing a tertiary amino group and such phenols which do not form coloured nitro compounds.

* * * * *